United States Patent
Harres

(10) Patent No.: US 7,581,141 B2
(45) Date of Patent: Aug. 25, 2009

(54) KERNEL MODULE COMPATIBILITY VALIDATION

(75) Inventor: John M. Harres, Thornton, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 461 days.

(21) Appl. No.: 11/365,278

(22) Filed: Mar. 1, 2006

(65) Prior Publication Data

US 2007/0220343 A1 Sep. 20, 2007

(51) Int. Cl.
G06F 11/00 (2006.01)
(52) U.S. Cl. .......................................... 714/38; 713/164
(58) Field of Classification Search .................. 714/38; 713/164
See application file for complete search history.

(56) References Cited

U.S. PATENT DOCUMENTS

| 5,734,822 | A * | 3/1998 | Houha et al. ................. 717/167 |
| 5,815,707 | A * | 9/1998 | Krause et al. ................ 719/321 |
| 6,047,323 | A * | 4/2000 | Krause ........................ 709/227 |
| 6,526,523 | B1 * | 2/2003 | Chen et al. ..................... 714/38 |
| 6,745,346 | B2 * | 6/2004 | Quach et al. ................... 714/42 |
| 6,889,167 | B2 * | 5/2005 | Curry, III ..................... 702/183 |
| 6,950,962 | B2 * | 9/2005 | Mathias et al. ................. 714/25 |
| 6,950,964 | B1 * | 9/2005 | McMichael et al. ........... 714/38 |
| 6,978,018 | B2 * | 12/2005 | Zimmer ....................... 380/30 |
| 7,028,229 | B2 * | 4/2006 | McGuire et al. .............. 714/57 |
| 7,058,968 | B2 * | 6/2006 | Rowland et al. ............... 726/1 |
| 7,069,474 | B2 * | 6/2006 | Atallah et al. .................. 714/39 |
| 7,076,770 | B2 * | 7/2006 | Handal ........................ 717/136 |
| 7,143,281 | B2 * | 11/2006 | Chandramouleeswaran et al. ............................ 713/100 |
| 7,146,611 | B1 * | 12/2006 | Phillips ....................... 717/174 |
| 7,216,369 | B2 * | 5/2007 | Wiseman et al. .............. 726/34 |
| 7,284,157 | B1 * | 10/2007 | McMichael et al. ........... 714/38 |
| 7,401,359 | B2 * | 7/2008 | Gartside et al. ............... 726/22 |
| 2002/0023211 | A1 * | 2/2002 | Roth et al. ................... 713/164 |
| 2002/0188730 | A1 * | 12/2002 | Tang et al. ................... 709/227 |
| 2003/0072318 | A1 * | 4/2003 | Lam et al. .................... 370/428 |
| 2003/0074551 | A1 * | 4/2003 | Chandramouleeswaran et al. ........................... 713/100 |
| 2003/0074604 | A1 * | 4/2003 | Mathias et al. ............... 714/38 |
| 2003/0097581 | A1 * | 5/2003 | Zimmer ...................... 713/200 |
| 2003/0120935 | A1 * | 6/2003 | Teal et al. .................... 713/188 |
| 2003/0145235 | A1 * | 7/2003 | Choo .......................... 713/201 |
| 2004/0054946 | A1 * | 3/2004 | Atallah et al. ................. 714/38 |
| 2004/0093359 | A1 * | 5/2004 | Sharpe et al. ............... 707/201 |
| 2004/0199817 | A1 * | 10/2004 | Butcher ....................... 714/25 |

(Continued)

OTHER PUBLICATIONS

Wikipedia Article, "Loadable kernel module", Feb. 27, 2006, <http://en.wikipedia.org/w/index.php?title=Loadable_kernel_module&oldid=41513224>.*

Primary Examiner—Robert Beausoliel
Assistant Examiner—Joshua P Lottich
(74) Attorney, Agent, or Firm—Dorsey & Whitney LLP

(57) ABSTRACT

In one embodiment, a method and apparatus for high-efficiency time-series archiving for computer server telemetry signals are disclosed. The method includes maintaining a data structure in a kernel module that identifies information related to a system including the kernel module, the information to be manipulated by the kernel module, comparing, by a kernel in the system that loads the kernel module, the data structure of the kernel module with one or more other data structures of kernel modules the kernel loads, and performing, by the kernel, an error routine if an incompatibility is found between the data structure and the one or more other data structures. Other embodiments are also disclosed.

20 Claims, 4 Drawing Sheets

U.S. PATENT DOCUMENTS

| | | | |
|---|---|---|---|
| 2004/0221275 A1* | 11/2004 | Handal | 717/136 |
| 2005/0071856 A1* | 3/2005 | Kumar et al. | 719/330 |
| 2005/0081220 A1* | 4/2005 | Yodaiken et al. | 719/331 |
| 2006/0075299 A1* | 4/2006 | Chandramouleeswaran et al. | 714/38 |
| 2006/0101263 A1* | 5/2006 | Costea et al. | 713/164 |
| 2006/0112241 A1* | 5/2006 | Weiss et al. | 711/154 |
| 2006/0174229 A1* | 8/2006 | Muser | 717/128 |
| 2007/0006045 A1* | 1/2007 | Mooney et al. | 714/38 |
| 2007/0022287 A1* | 1/2007 | Beck et al. | 713/164 |
| 2007/0079178 A1* | 4/2007 | Gassoway | 714/38 |

* cited by examiner

| APPLICATION PROGRAMS | | |
|---|---|---|
| *120* | | |
| SHELL | | |
| *140* | | |
| KERNEL | | |
| *160* | | |
| KERNEL MODULE *180* | KERNEL MODULE *180* | KERNEL MODULE *180* |
| DEVICE *190* | DEVICE *190* | DEVICE *190* |

MODULE DATA STRUCTURE 200

| FIELD NAME 210 | TYPE 220 | SIZE 230 | OFFSET 240 |
|---|---|---|---|
| VENDOR (250) | ARRAY OF 80 CHARACTERS | 80B | 0 |
| SIZE (260) | INTEGER | 4B | 80 |
| BYTES READ (270) | INTEGER | 4B | 84 |
| BYTES WRITTEN (280) | INTEGER | 4B | 88 |

*FIG. 2A*

UPDATED MODULE DATA STRUCTURE 205

| FIELD NAME 210 | TYPE 220 | SIZE 230 | OFFSET 240 |
|---|---|---|---|
| VENDOR (250) | ARRAY OF 80 CHARACTERS | 80B | 0 |
| SIZE (260) | INTEGER | 4B | 80 |
| GEOMETRY (290) | INTEGER | 4B | 84 |
| BYTES READ (270) | INTEGER | 8B | 88 |
| BYTES WRITTEN (280) | INTEGER | 4B | 96 |

*FIG. 2B*

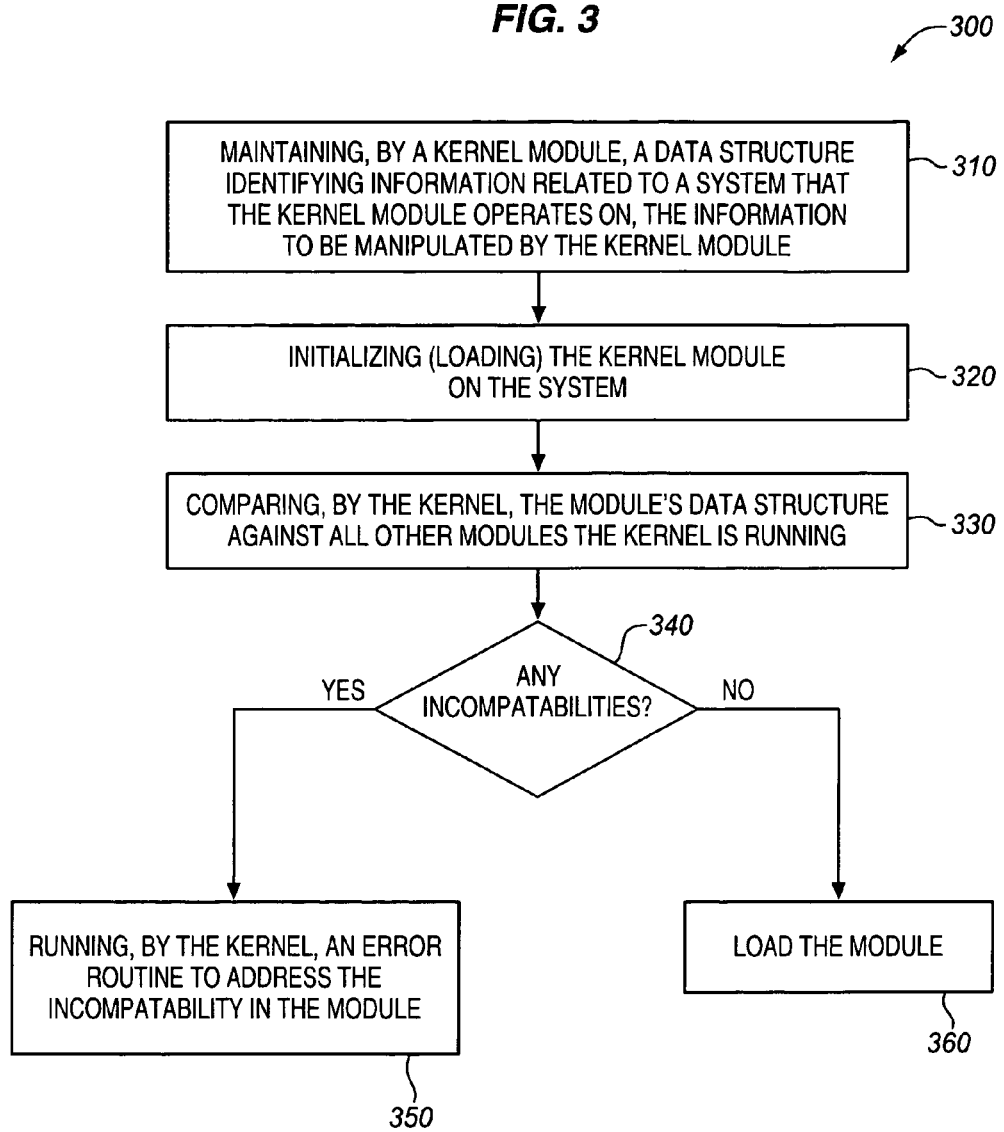

KERNEL MODULE COMPATIBILITY VALIDATION

FIELD OF INVENTION

An embodiment of the invention relates to computer systems, and more specifically, to kernel module compatibility validation.

BACKGROUND OF INVENTION

One central component of a computer system is its operating system kernel. The kernel is a piece of software responsible for providing secure access to the computer system's hardware and to various computer processes. Accessing the hardware directly can be very complex, as there are different hardware designs for the same type of component. Kernels usually implement some hardware abstraction to hide the underlying complexity from the operating system and provide a clean and uniform interface to the hardware.

Kernels typically may employ one or more modules to assist in the functionality of the kernel. Kernel modules are pieces of code that can be loaded and unloaded into the kernel upon demand. They extend the functionality of the kernel without the need to reboot the system. One example of a kernel module is a device driver, which allows the kernel to access hardware connected to the system of the kernel. Without modules, new functionality would have to be added directly into the kernel, creating the disadvantage of requiring the kernel to be rebuilt and rebooted every time the functionality needed to be added.

Currently, most kernels are not statically linked and loaded, but instead dynamically linked in kernel modules and drivers at run time to provide functionality and/or support as needed. When a program is compiled statically, the kernel modules can be validated against one another as they are loaded. However, with current dynamic loading, most of the information that would have been present at a static loading build time is not present at a run time of the dynamic loading.

Therefore, dynamically-loaded kernels are vulnerable to problems where shared objects or understanding of object contents can differ between modules. Currently, no automated checking is done between these shared objects to ensure compatibility. As a system has modules patched or loaded from third-party companies, the potential for incompatible modules increases as there is no ability to cross-check the modules because the vendors are not privy to one another's module construction. When an incompatibility does occur, it can cause data corruption, system crashes, and other negative consequences. An attempt could be made to find the problems. Yet, this requires expert analysis of all involved modules and some luck in finding the problem. Time has shown that problems like this occur with frequency and are nearly impossible to diagnose.

SUMMARY OF INVENTION

The present invention includes novel methods and apparatus for kernel module compatibility validation.

According to one embodiment of the invention, a method is disclosed. The method includes maintaining a data structure in a kernel module that identifies information related to a system including the kernel module, the information to be manipulated by the kernel module, comparing, by a kernel in the system that loads the kernel module, the data structure of the kernel module with one or more other data structures of kernel modules the kernel loads, and performing, by the kernel, an error routine if an incompatibility is found between the data structure and the one or more other data structures.

According to another embodiment of the invention, an apparatus is disclosed. The apparatus includes a processor and a memory unit coupled to the processor including instructions to execute a kernel. The kernel is further to initialize a kernel module to maintain a data structure that identifies information related to a system, the information to be manipulated by the kernel module, compare the data structure of the kernel module with one or more other data structures of kernel modules the kernel loads, and perform an error routine if an incompatibility is found between the data structure and the one or more other data structures.

BRIEF DESCRIPTION OF THE DRAWINGS

The invention may be best understood by referring to the following description and accompanying drawings that are used to illustrate embodiments of the invention. In the drawings:

FIG. 2A is a block diagram illustrating one embodiment of a module data structure;

FIG. 2B is a block diagram illustrating one embodiment of an updated module data structure;

FIG. 3 is a flow diagram illustrating a method according to one embodiment of the invention.

DETAILED DESCRIPTION

Figure 1:
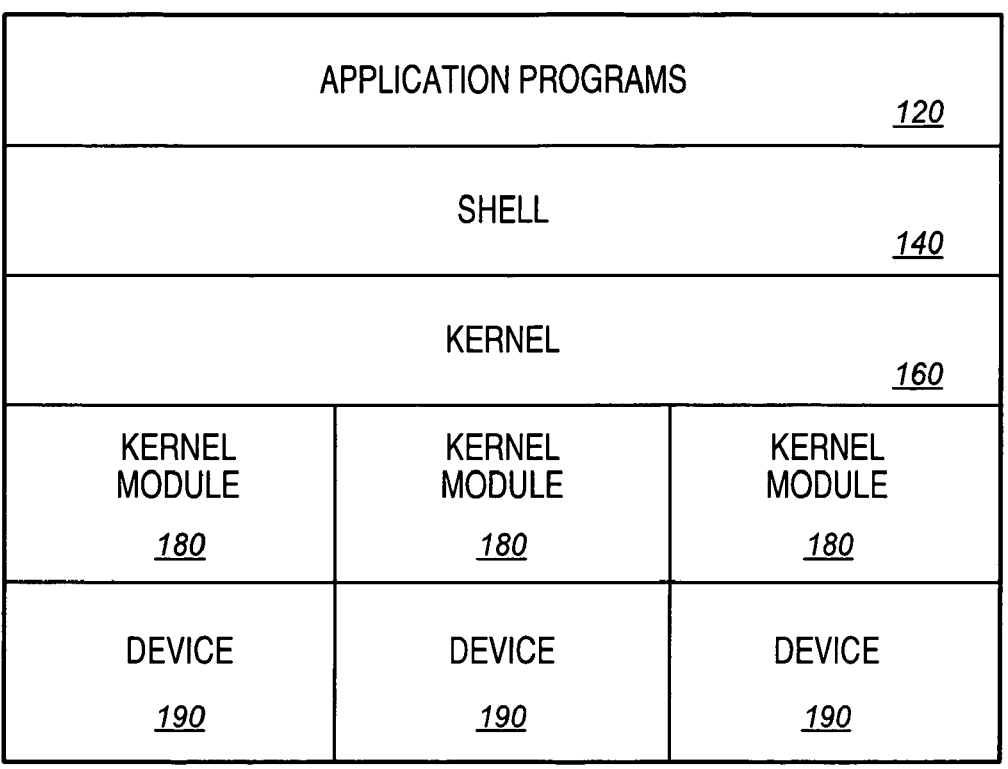
FIG. 1 is a block diagram of one embodiment of various functional units involved in interfacing application programs to system devices.

A method and apparatus are described for kernel module compatibility validation. According to one embodiment, the method includes maintaining a data structure in a kernel module that identifies information related to a system including the kernel module, the information to be manipulated by the kernel module, comparing, by a kernel in the system that loads the kernel module, the data structure of the kernel module with one or more other data structures of kernel modules the kernel loads, and performing, by the kernel, an error routine if an incompatibility is found between the data structure and the one or more other data structures.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EE-PROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Embodiments of the invention introduce a novel method to implement kernel module compatibility validation. The kernel module compatibility validation prevents conflicting kernel modules from being loaded together. At the least, the compatibility validation identifies conflicts as early as possible so that they can be remedied. This reduces, or possibly eliminates, conflicts that exist in running kernels, thereby increasing reliability and improving uptime of systems.

FIG. 1 is a block diagram illustrating various functional units involved in interfacing application programs to various system devices. Reference numeral 100 generally indicates a functional unit involved in interfacing application packages or programs to devices in a computer system. The unit 100 includes various applications 120, a shell 140, a kernel 160, kernel modules 180, and various hardware devices or peripherals 190.

The applications 120 typically include a word processor, a spreadsheet program, a web browser, or any other application that may be run on a computer system. The various applications 120 use common hardware on the computer system and, accordingly, an interface should be provided between the various different applications and each hardware or peripheral device 190. This interface is provided by the kernel 160 that interacts with the applications 120 via the shell 140 and with the devices 190. In addition, some devices 190 may also be interacted with via the kernel modules 180.

The kernel 160 defines the heart of an operating system, such as a UNIX-based operating system. Under control of the kernel 160, the shell 140 interprets user commands of the application programs 120 whereupon the kernel 160 exports various application program interfaces (APIs) to the relevant devices 190 for execution.

In some cases, a device 190 may be viewed as a file system and the kernel modules 180 accordingly communicate data in a binary format to the file system interface via specific APIs. Accordingly, each kernel module 180 is typically configured for the specific hardware that it drives and, since the kernel module 180 obtains its commands from the kernel 160, the kernel module 180 and the kernel 160 should be configured to function with each other.

FIG. 2A is a block diagram illustrating a data structure that may be included in a kernel module according to embodiments of the invention. In one embodiment, the kernel module including the data structure may be the same as kernel module 180 described with respect to FIG. 1. In some embodiments, data structure 200 corresponds to information about various components, such as a storage disk, that contain data which the kernel module may manipulate.

In one embodiment, data structure 200 includes information such as field name 210, type 220, size 230, and offset 240. Data structure 200 may include various fields 210, such as vendor 250, size 260, bytes read 270, and bytes written 280. The type 220 information identifies the actual data type of the field (e.g., array, integer, floating point, etc.). The offset 240 identifies the storage location in the physical memory for the specific field 210.

For example, the vendor 250 field 210 of the data structure 200 includes a type 220 of an array of 80 characters, a size 230 of 80B, and an offset 240 of 0. The other fields 210 of the data structure 200 contain corresponding information for the specific fields. This information may be used by the kernel module for debugging purposes, and, as described below, for compatibility validation with other modules.

In some cases, changes may be made to the disk so that the information contained in the data structures 200 of various kernel modules is no longer correct. For instance, the size 230 of a field 210 may be increased or decreased. In some cases, additional information may be added or deleted from the disk. These changes may lead to incorrect information being stored in data structures 200 of kernel modules. For example, a change in the size 230 information for a field 210 may affect the offset 240 information for other fields 210 following the affected field 210 on the disk. FIG. 2B provides an example of such a situation.

FIG. 2B is a block diagram illustrating an updated data structure 205 of a kernel module after a change has been made to a component of the kernel module. Data structure 205 is the updated version of data structure 200. In one embodiment, it may be assumed that a component being manipulated by the kernel module has been altered so that an additional field 210 has been added. This new field 210 is geometry information 290 (i.e., number of platters). The geometry field 290 includes a type 220 of integer, a size 230 of 4B, and an offset of 84. Furthermore, the size 230 of the bytes read information 270 has been increased from 4B to 8B.

In order for the kernel module to operate and interact correctly, the kernel module should include an updated data structure similar to data structure 205. In FIG. 2B, the same information as that included in data structure 200 of FIG. 2A is present, with the addition of the geometry information 290. Furthermore, the size 230 of the bytes read information 270 was increased to 8B. As can be seen, the addition of the geometry information 290 affects the offsets 240 of both the bytes read 270 and bytes written 280 information. Also, the size 230 of the bytes read information 270 affects the offset 240 of the bytes written information 280.

If a kernel module is unaware of these component modifications, it would be loaded with old data structure 200 of FIG. 2A. Operating with this incorrect data structure 200 may cause potentially devastating effects to the operation of the kernel, as well as to the system that the kernel is operating with. In one embodiment, it may cause data that the kernel module believed to be part of the bytes read 270 field of memory to be manipulated, which would actually affect the geometry field 290 of the updated module. Depending on the data being actually manipulated, this could lead to system crashes and other negative effects.

FIG. 3 is a flow diagram illustrating a method according to one embodiment of the invention. Process 300 addresses the potential for incompatible data structures in kernel modules.

Process 300 begins at processing block 310, where a kernel module maintains a data structure that identifies information related to a system that the kernel module operates on. The information contained in the data structure may potentially be manipulated by the kernel module. In one embodiment, this data structure is the same as data structure 200 or 205 illustrated with respect to FIGS. 2A and 2B.

Then, at processing block 320, the kernel initializes the kernel module on the system. At processing block 330, the kernel compares the kernel module's data structure with all other data structures of kernel modules running on the system for incompatibilities. In some embodiments, this comparison includes matching the field names, types, sizes, and offsets of the information included in the data structures. For example, if an offset of a particular field in the data structure of kernel module being tested does not match an offset of the same field in another kernel module, then an incompatibility has occurred.

In some embodiments, it is envisioned that a signature or checksum may be utilized for the compatibility validation. Furthermore, a subset of the various components of a data structure may be compared, instead of comparing the complete set of components, in order to save time in the compatibility validation.

At decision block 340 it is determined whether there are any incompatibilities present between kernel modules. If so, then at processing block 350, the kernel runs an error routine to address the incompatibility.

In one embodiment, this error routine may include generating an error message identifying the incompatibility. In another embodiment, the error routine may include correcting the incompatibility in the kernel module being initialized in order to make the data structure compatible with the updated component structure. In other embodiments, the error routine may include refusing to load the kernel module. The error routine may also be some combination of all of these embodiments. If no incompatibilities are found, then at processing block 360 the kernel module is loaded in a normal fashion.

In some embodiments, the compatibility validation may occur at the time of system boot-up. It may also occur any time a kernel module is initialized. It is further envisioned that the compatibility validation may occur after the system is fully-booted, so that a cross-check of all the module information may take place while the system is still live. This may be done on-demand or at a scheduled time.

In some embodiments, the compatibility validation may occur after a system crash occurs. For example, a tool may be run to analyze the kernel and kernel module memory and determine whether there are any kernel module incompatibilities. One skilled in the art will appreciate the variety of implementations possible for the compatibility validation.

Figure 4:
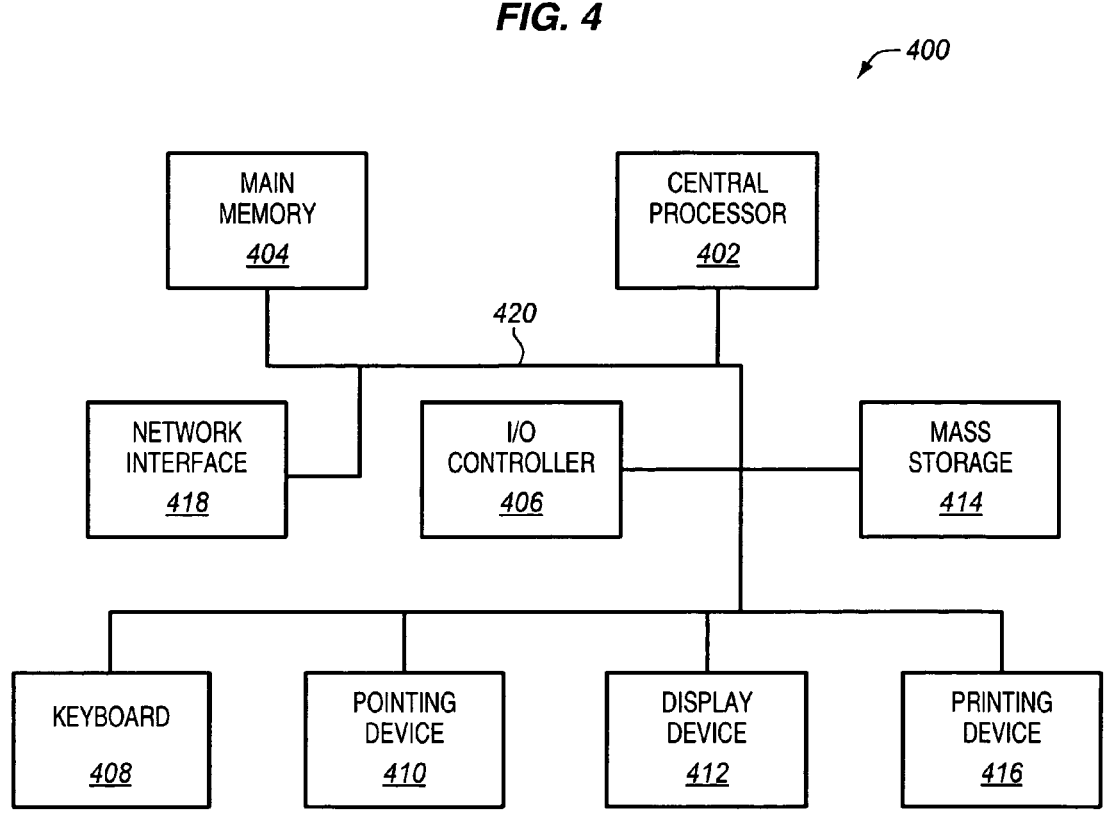
FIG. 4 is an illustration of an embodiment of a computer system.

FIG. 4 illustrates an exemplary computer system 400 in which certain embodiments of the present invention may be implemented. In one embodiment, the components of FIG. 1 may be implemented as system 400 or as components of system 400.

System 400 comprises a central processor 402, a main memory 404, an input/output (I/O) controller 406, a keyboard 408, a pointing device 410 (e.g., mouse, track ball, pen device, or the like), a display device 412, a mass storage 414 (e.g., a nonvolatile storage such as a hard disk, an optical drive, and the like), and a network interface 418. Additional input/output devices, such as a printing device 416, may be included in the system 400 as desired. As illustrated, the various components of the system 400 communicate through a system bus 420 or similar architecture.

In a further embodiment, system 400 may be a distributed computing system. In other words, one or more of the various components of the system 400 may be located in a physically separate location than the other components of the system 400. Such components may be accessed and connected via a network to the other components In accordance with an embodiment of the present invention, the computer system 400 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 402 may be a complex instruction set computer (CISC) microprocessor, a reduced instruction set computing (RISC) microprocessor, a very long instruction word (VLIW) microprocessor, a processor implementing a combination of instruction sets, and the like.

The network interface 418 provides communication capability with other computer systems on a same local network, on a different network connected via modems and the like to the present network, or to other computers across the Internet. In various embodiments of the present invention, the network interface 418 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 400 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 400 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
   maintaining a data structure in a kernel module that identifies information related to a system including the kernel module, the information corresponding to a component of the system that the kernel module is operable to manipulate;
   comparing, by a kernel in the system that loads the kernel module, the data structure of the kernel module with at least one other data structure of at least one other kernel module loaded by the kernel, the at least one other data structure identifying information corresponding to the component of the system that the at least one other kernel module is operable to manipulate; and
   performing, by the kernel, an error routine if an incompatibility is found between the data structure and the at least one other data structure,
   wherein kernel modules are segments of code that can be loaded and unloaded into the kernel to assist in a function of the kernel.

2. The method of claim 1, wherein the comparing is performed when the kernel module is initialized by the kernel.

3. The method of claim 1, wherein the comparing is performed upon the boot-up of the system.

4. The method of claim 1, wherein the comparing is performed upon a failure of the system.

5. The method of claim 1, wherein the comparing is performed while the system is fully booted upon at least one of an on-demand request or a scheduled time.

6. The method of claim 1, wherein the error routine includes at least one of refusing to initialize the kernel module, indicating by the kernel the incompatibility to the system, and correcting the incompatibility in the kernel module.

7. The method of claim 1, wherein the data structure stores at least one of a field name, type, size, and offset corresponding to the component.

8. The method of claim 7, wherein the incompatibility is found when there is a mismatch between at least one of the field names, types, sizes, or offsets corresponding to the component between the data structure and the at least one other data structure.

9. The method of claim 1, wherein at least one of a signature and a checksum is utilized for the comparing the data structure with the at least one other data structure.

10. An article of manufacture, comprising a computer-readable storage medium including data that, when accessed by a machine, cause the machine to perform operations comprising:
    maintaining a data structure in a kernel module of a system, the data structure identifying at least one of a field name, type, size, and offset corresponding to a component of the system that the kernel module is operable to manipulate;
    comparing, by a kernel in the system that loads the kernel module, the data structure of the kernel module with at least one other data structure of at least one other kernel module loaded by the kernel, the at least one other data structure identifying at least one of the field name, type, size, and offset corresponding to the component of the system that the at least one other kernel module is operable to manipulate; and
    performing, by the kernel, an error routine if an incompatibility is found between the data structure and the at least one other data structure,
    wherein kernel modules are segments of code that can be loaded and unloaded into the kernel to assist in a function of the kernel.

11. The article of manufacture of claim 10, wherein the comparing is performed when the kernel module is initialized by the kernel.

12. The article of manufacture of claim 10, wherein the comparing is performed upon the boot-up of the system.

13. The article of manufacture of claim 10, wherein the comparing is performed upon a failure of the system.

14. The article of manufacture of claim 10, wherein the comparing is performed while the system is fully booted upon at least one of an on-demand request or a scheduled time.

15. The article of manufacture of claim 10, wherein the error routine includes at least one of indicating the incompatibility to the system, refusing to initialize the kernel module, and correcting the incompatibility in the kernel module.

16. The article of manufacture of claim 10, wherein the incompatibility is found when there is a mismatch between at least one of the field names, types, sizes, or offsets corresponding to the component between the data structure and the at least one other data structure.

17. An apparatus, comprising:
    a processor; and
    a memory unit coupled to the processor including instructions to execute a kernel, the kernel to:
       initialize a kernel module to maintain a data structure that identifies information related to a system, the information corresponding to a component of the system that by the kernel module is operable to manipulate;
       compare the data structure of the kernel module with at least one other data structure of at least one other kernel module loaded by the kernel, the at least one other data structure identifying information corresponding to the component of the system that the at least one other kernel module is operable to manipulate; and
       perform an error routine if an incompatibility is found between the data structure and the at least one other data structure,
    wherein kernel modules are segments of code that can be loaded and unloaded into the kernel to assist in a function of the kernel.

18. The apparatus of claim 17, wherein the comparing is performed at least at one of when the kernel module is initialized by the kernel, upon the boot-up of the system, upon a failure of the system, and while the system is fully booted upon at least one of an on-demand request or a scheduled time.

19. The apparatus of claim 17, wherein the error routine includes at least one of refusing to initialize the kernel module, indicating the incompatibility to the system, and correcting the incompatibility in the kernel module.

20. The apparatus of claim 17, wherein the data structure stores at least one of a field name, type, size, and offset corresponding to the component.

* * * * *